United States Patent
Belleschi

(10) Patent No.: US 10,932,288 B2
(45) Date of Patent: Feb. 23, 2021

(54) WIRELESS DEVICE, RADIO NETWORK NODE AND METHODS PERFORMED THEREIN FOR HANDLING COMMUNICATION BETWEEN WIRELESS DEVICES IN A WIRELESS COMMUNICATION NETWORK

(71) Applicant: Telefonaktiebolaget LM Ericsson (publ), Stockholm (SE)

(72) Inventor: Marco Belleschi, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/309,971

(22) PCT Filed: Nov. 29, 2018

(86) PCT No.: PCT/SE2018/051233
§ 371 (c)(1),
(2) Date: Dec. 14, 2018

(87) PCT Pub. No.: WO2019/108123
PCT Pub. Date: Jun. 6, 2019

(65) Prior Publication Data
US 2020/0084669 A1    Mar. 12, 2020

Related U.S. Application Data

(60) Provisional application No. 62/591,809, filed on Nov. 29, 2017.

(51) Int. Cl.
*H04W 72/12* (2009.01)
*H04W 28/02* (2009.01)
*H04W 28/18* (2009.01)

(52) U.S. Cl.
CPC ... *H04W 72/1263* (2013.01); *H04W 28/0268* (2013.01); *H04W 28/0278* (2013.01); *H04W 28/18* (2013.01); *H04W 72/1236* (2013.01)

(58) Field of Classification Search
CPC ......... H04W 28/0268; H04W 28/0278; H04W 28/18; H04W 28/20; H04W 28/22;
(Continued)

(56) References Cited

U.S. PATENT DOCUMENTS

| | | | |
|---|---|---|---|
| 2017/0048745 A1* | 2/2017 | Yi | H04W 76/14 |
| 2017/0245171 A1* | 8/2017 | Jung | H04W 72/0413 |
| 2019/0053215 A1* | 2/2019 | Yu | H04W 28/0268 |

FOREIGN PATENT DOCUMENTS

EP    3125643 A1    2/2017

OTHER PUBLICATIONS

Unknown, Author, "Discussion on Carrier Selection in PC5 CA", 3GPP TSG-RAN WG2 Meeting #100, R2-1713070, Nov. 27-Dec. 1, 2017, 6 pages.

(Continued)

*Primary Examiner* — Pao Sinkantarakorn
(74) *Attorney, Agent, or Firm* — Murphy, Bilak & Homiller, PLLC

(57) ABSTRACT

Embodiments herein relate e.g. to a method performed by a radio network node (12) for handling communication between wireless devices over a sidelink in a wireless communication network. The radio network node receives from a wireless device (10) of the wireless devices, an indication in a buffer status report, wherein the indication indicates one or more QoS requirements or characteristics of a packet in a buffer associated to the buffer status report, wherein the one or more QoS requirements or characteristics comprise at least one of: reliability, latency, and data rate; and wherein the indication is associated with a logical (Continued)

channel. The radio network node handles the communication of the wireless device taking the received indication into account.

14 Claims, 13 Drawing Sheets

(58) Field of Classification Search
CPC ............ H04W 28/24; H04W 72/1284; H04W 72/1289; H04W 72/1263
See application file for complete search history.

(56) References Cited

OTHER PUBLICATIONS

Unknown, Author, "Sidelink Carrier Selection Criteria", 3GPP TSG-RAN WG2 #99bis, Tdoc R2-1711493, Ericsson, Prague, Czech Republic, Oct. 9-13, 2017, 6 pages.

* cited by examiner

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |
| Destination index₁ | LCG ID₃ | Buffer Size₃ | Oct 4 |
| Buffer Size₃ | Destination index₂ | | Oct 5 |
| LCG ID₄ | Buffer Size₄ | | Oct 6 |

Oct 1–3: PPPP
Oct 4–6: Reliability

FIG. 4

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |
| R R R | R R R | G G | Oct 3 |

FIG. 5

WIRELESS DEVICE, RADIO NETWORK NODE AND METHODS PERFORMED THEREIN FOR HANDLING COMMUNICATION BETWEEN WIRELESS DEVICES IN A WIRELESS COMMUNICATION NETWORK

TECHNICAL FIELD

Embodiments herein relate to a wireless device, a radio network node and methods performed therein regarding wireless communication. In particular, embodiments herein relate to handling communication of the wireless device in a wireless communication network.

BACKGROUND

In a typical wireless communication network, wireless devices, also known as wireless communication devices, mobile stations, stations (STA) and/or user equipments (UE), may communicate via a Radio Access Network (RAN) to one or more core networks (CN). The RAN covers a geographical area which is divided into service areas, also known as cells, with each cell area being served by a radio network node e.g., a Wi-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming, Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The 3GPP standard for telecommunications is continuously developing into different versions or releases. During Release 12, the LTE standard was extended with a support of device to device (D2D) features, also referred to as sidelink features, targeting both commercial and Public Safety applications. Some applications enabled by Rel-12 LTE are device discovery, where wireless devices are able to sense the proximity of another wireless device and an associated application by broadcasting and detecting discovery messages that carry wireless device identities and application identities. Another application consists of direct communication based on physical channels terminated directly between wireless devices. In 3GPP, all of these applications are defined under an umbrella named Proximity Services (ProSe).

One of the potential extensions of the ProSe framework consists of support of Vehicle to Anything (V2x) communication, which includes any combination of direct communication between vehicles, pedestrians, and infrastructure. V2x communication may take advantage of a network (NW) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure, denoted as vehicle to infrastructure (V2I), and vehicle to pedestrians (V2P) and vehicle to vehicle (V2V) communications, as compared to using a dedicated V2x technology.

There are many research projects and field tests of connected vehicles in various countries or regions, including projects that are based on the use of existing cellular infrastructure.

V2x communications may carry both non-safety and safety information, where each of the applications and services may be associated with specific requirements sets, e.g., in terms of latency, reliability, capacity, etc. From the application point of view, V2X includes the following types of communication/services, see FIG. 1.

V2V: Covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information, such as position, direction, and speed, transmitted to other vehicles in the proximity repeatedly e.g. every 100 ms-1s. Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. Main characteristic of V2V applications is the tight requirements on latency that can vary from 20 ms, e.g. for pre-crash warning messages, to 100 ms for other road safety services.

V2I: This comprises communication between vehicles and a Roadside Unit (RSU). The RSU is a stationary transportation infrastructure entity which communicates with vehicles in its proximity. An example of V2I is a transmission of speed notifications from the RSU to vehicles, as well as queue information, collision risk alerts, curve speed warnings. Due to the safety related nature of V2I, delay requirements are similar to V2V requirements.

V2P: Covers communication between vehicles and vulnerable road users, such as pedestrians, using V2P applications. V2P typically takes place between distinct vehicles and pedestrians either directly or via infrastructure such as cellular network.

Vehicle to network (V2N): Covers communication between a vehicle and a centralized application server, or an Intelligent Transportation System (ITS) Traffic Management Center, both using V2N applications, via infrastructure, such as a cellular network. One example is a bad road condition warning sent to all vehicles in a wide area, or traffic flow optimization in which V2N application suggests speeds to vehicles and coordinates traffic lights. Therefore, V2N messages are supposed to be controlled by a centralized entity, i.e. the Traffic Management Center, and provisioned to vehicles in a large geographical area, rather than in a small area. Additionally, unlike V2V or V2I, latency requirements are more relaxed in V2N because it is not meant to be used for non-safety purposes, e.g. 1 s latency requirement is typically considered.

As previously mentioned Sidelink transmissions, also known as D2D transmissions or ProSe transmissions, over a radio interface called PC5 interface in cellular spectrum have been standardized in 3GPP since release (Rel)-12. In 3GPP Rel-12 two different transmission modes have been specified in 3GPP, In one mode, called mode-1, a wireless device in an RRC_CONNECTED mode requests D2D resources and the radio network node grants the resources via a Physical Downlink Control Channel (PDCCH) e.g. sending DL control information such as DCI5, or via a dedicated signalling. In another mode called mode-2, a wireless device autonomously selects resources for transmission from a pool of available resources that the radio network node provides in a broadcast via a system information block (SIB) signalling for transmissions on carriers other than a Primary Cell (PCell) or via a dedicated signalling for transmission on the PCell. Therefore, unlike the first operation mode, i.e. mode-1, the second operation mode, i.e. mode-2, can be performed also by wireless devices in an RRC_IDLE mode and in some cases even by wireless devices out of coverage.

In Rel.14, the usage of sidelink transmissions is extended to the V2x domain. The original design of the sidelink physical layer in Rel.12 targeted a scenario with a small number of wireless devices competing for the same physical resources in the spectrum, to carry voice packet for mission critical push to talk (MCPTT) traffic, and assumed low wireless device mobility. On the other hand, in V2x the sidelink should be able to cope with higher load scenario, i.e. hundreds of cars potentially contending for physical resources, to carry time or event triggered V2x messages such as CAM and DENM, and with high wireless device mobility. For such reasons, 3GPP has discussed possible enhancements to the sidelink physical layer.

A first enhancement that has been specified in Rel.14 is the introduction of a new transmission mode, called mode-3, which resembles mode-1 in the sense that it is the radio network node that explicitly assigns sidelink resources to the wireless device. However, unlike mode-1, the radio network node has the possibility to configure the sidelink resources semi-persistently in a Semi Persistent scheduling (SPS)-like fashion, i.e. the radio network node assigns a sidelink grant for periodic transmissions on e.g. a certain frequency resource.

A second enhancement is the introduction of the so-called channel sensing and sensing-aware wireless device autonomous resource allocation, which corresponds to a fourth mode called mode-4 transmission mode. Unlike random resource selection which is the base for Rel.12 and Rel.13 ProSe communications, in V2V (Rel-14) wireless devices are expected to continuously sense the channel and search for resources in the different part of the spectrum that are less interfered. Such sensing has the objective to limit collisions between wireless devices.

Two types of sensing have been considered in 3GPP:
Sensing based on received power, A wireless device measures the received energy on specific radio resources:
For example, based on these measurements, the wireless device decides whether the radio resources are considered to be in use by some other wireless device, i.e., 'busy', or not, i.e., 'idle'.
For example, the wireless device may use the measurements to estimate whether the transmitter is far away, e.g., if the signal is weak, or nearby, e.g., if the signal is strong.
Sensing based on packet contents. A wireless device receives a packet and decodes it. Based on the information extracted from the packet, the wireless device may obtain some knowledge about the utilization of radio resources:
For example, by reading a scheduling assignment (SA) packet a wireless device may know in which radio resources to expect data transmissions, and the priority level of the transmitter.
For example, by reading a data packet a wireless device may know the position of the transmitter, the identity (ID) of transmitter, the type of transmitter, etc.

Although in mode-4 the wireless device autonomously selects the transmission resources on the basis of the sensing results, it is still possible for the radio network node to signal some sets of the values that the wireless device is allowed to use for certain transmission parameters. For example, for the number of physical resource blocks (PRB) used by a wireless device for a transmission the radio network node may specify a minimum and maximum value, i.e., the wireless device is not allowed to use less than X PRBs or more than Y PRBs for the transmission; whether the wireless device is allowed to transmit or not; the maximum and minimum modulation and coding scheme (MCS) the wireless device can use, the minimum and/or maximum transmission power; etc. In other words, the radio network node can restrict the set of values that the wireless device can select for certain transmission parameters. Such sets or restrictions on the transmission parameters may be configured differently by the network for different wireless device conditions e.g. depending on the wireless device speed or channel congestion status. In addition to configuration by the radio network node, or a NW node in general, the sets or restrictions may also be part of a pre-configuration. Pre-configuration may be used as an alternative or as a complement to configuration by the radio network node.

In regards to sidelink quality of service (QoS), it should be noted that each packet to be transmitted over the PC5 interface is marked by the application layer to a specific packet tag, called ProSe per packet priority (PPPP). Each PPPP represent a priority assigned by the application layer to a given sidelink packet. In particular, each PPPP can assume values from 1 to 8, where 1 represents the highest priority PPPP and 8 the lowest priority.

Depending on the PPPP assigned by application layers, different RAN procedures are applied. For example, for different PPPPs, different transmission parameters, e.g. MCS, transmitting power, number of PRBs, etc., may be applied by the wireless device, according to a network configuration. The PPPP may also be used to determine whether a certain pool, or a certain carrier could be used depending on an interference or a congestion situation experienced in that pool. In this way, a sort of admission control procedure based on the PPPP can be performed, so that, for example, higher-priority PPPP should be transmitted in lowest congested carriers or pool to increase the probability of correct reception.

In the medium access control (MAC) layer, the PPPP are mapped to the logical channel identities (LCID) by the wireless device for logical channel prioritization when building a MAC protocol data unit (PDU). The PPPP are also mapped to different logical channel groups (LCG), according to network configuration, and used in a sidelink (SL) buffer status report (BSR), so that the radio network node can provide proper sidelink grant when scheduling the wireless device.

SUMMARY

It should be noted that the radio interface framework such as interface Uu quality of service (QoS) framework associates to each quality class index (QCI), different performance requirements such as data rate e.g. Guarantee bit rate (GBR) or non-GBR, packet delay budget, reliability i.e. the packet error rate (PER). However, unlike the Uu QoS framework, at the moment up to Rel.14, no performance requirement, other than the PPPP, is associated to a sidelink packet. Thus, in current sidelink framework, there is no sidelink performance indicator, other than the PPPP. This may limit the ability of the existing scheduling allocation procedures, e.g. for both mode-3 and mode-4, to properly serve a given wireless device. In fact, the PPPP exclusively indicates the priority in which a given packet should be served by radio network node scheduler, for radio network node-scheduler random access (RA), or by the wireless device, for wireless device autonomous RA. However, in some cases, it might be useful to know the reliability requirement of a given SL packet, so that specific actions could be performed, e.g. it may be configured SL packet duplication over different SL carriers to increase correct reception probability, or more conservative encoding could be adopted if reliability requirements are strict. Similarly, if high data rates are required, a higher number of carriers may be used, or more aggressive encoding and larger bandwidth may be allocated.

Therefore, in the legacy sidelink framework, the wireless device just reports to the network in the SL BSR the LCGs associated to the PPPPs of the packets which are in the wireless device SL buffer at the moment. As such, the network may only be aware of the PPPP of the packet in the SL buffer, and no indication of the reliability, data rate, or other QoS requirement can be retrieved.

An object herein is to provide a mechanism to in an efficient manner enable device to device communication in a wireless communication network.

According to an aspect the object is achieved, according to embodiments herein, by providing a method performed by a radio network node for handling communication between wireless devices over a sidelink in a wireless communication network. The radio network node receives from a wireless device of the wireless devices, an indication in a buffer status report, wherein the indication indicates one or more QoS requirements or characteristics of a packet in a buffer associated to the buffer status report. The indication being associated with a logical channel and the one or more QoS requirements or characteristics comprise at least one of: reliability, latency, and data rate. The radio network node then handles the communication of the wireless device taking the received indication into account.

According to another aspect the object is achieved, according to embodiments herein, by providing a method performed by a wireless device for handling communication between wireless devices such as the wireless device and another wireless device over a sidelink in a wireless communication network. The wireless device transmits to a radio network node, an indication in a buffer status report, wherein the indication indicates one or more QoS requirements or characteristics of a packet in a buffer associated to the buffer status report. The indication being associated with a logical channel and the one or more QoS requirements or characteristics comprise at least one of: reliability, latency, and data rate.

It is furthermore provided herein a computer program product comprising instructions, which, when executed on at least one processor, cause the at least one processor to carry out any of the methods above, as performed by the radio network node or the wireless device. It is additionally provided herein a computer-readable storage medium, having stored thereon a computer program product comprising instructions which, when executed on at least one processor, cause the at least one processor to carry out the method according to any of the methods above, as performed by the radio network node or the wireless device.

According to embodiments herein the object may be achieved by providing a radio network node for handling communication between wireless devices over a sidelink in a wireless communication network. The radio network node is configured to receive from a wireless device of the wireless devices, an indication in a buffer status report, wherein the indication indicates one or more QoS requirements or characteristics of a packet in a buffer associated to the buffer status report. The indication is associated with a logical channel and wherein the one or more QoS requirements or characteristics comprise at least one of: reliability, latency, and data rate. The radio network node further handles handle the communication of the wireless device taking the received indication into account.

According to embodiments herein the object may be achieved by providing a wireless device for handling communication between the wireless device and another wireless device over a sidelink in a wireless communication network. The wireless device is configured to transmit to a radio network node, an indication in a buffer status report, wherein the indication indicates one or more QoS requirements or characteristics of a packet in a buffer, in the wireless device, associated to the buffer status report. The indication is associated with a logical channel and the one or more QoS requirements or characteristics comprise at least one of: reliability, latency, and data rate.

Embodiments herein provide methods for the wireless device to report to the radio network node one or more QoS requirements or characteristics e.g. sidelink QoS indicators such as data rate, reliability, latency, of a packet in a BSR, The indication is associated to a logical channel and thereby the signalling of the QoS requirements or characteristics may be efficient since the indication may e.g. be a value representing a LCG of a certain performance.

The radio network node may have tools to retrieve some sidelink QoS indicators, so that proper scheduling decisions can be taken, e.g. the radio network node may activate sidelink packet duplication if the wireless device has packets in the SL buffer which require high reliability delivery, or it may activate one or more carriers depending on the data rate of the packet to transmit in the SL buffer. Decisions on the actual transmitting parameters, e.g. MCS, TX power, number of PRBs, etc., to be adopted by the wireless device may also be affected by the received indication. This results in more flexible solution providing a wireless communication network of improved performance.

BRIEF DESCRIPTION OF THE DRAWINGS

Embodiments will now be described in more detail in relation to the enclosed drawings, in which:

FIG. 4 shows mapping of LCGs to different LCG sets for different QoS characteristics;

FIG. 5 shows group reporting in MAC CE;

DETAILED DESCRIPTION

Figure 1:
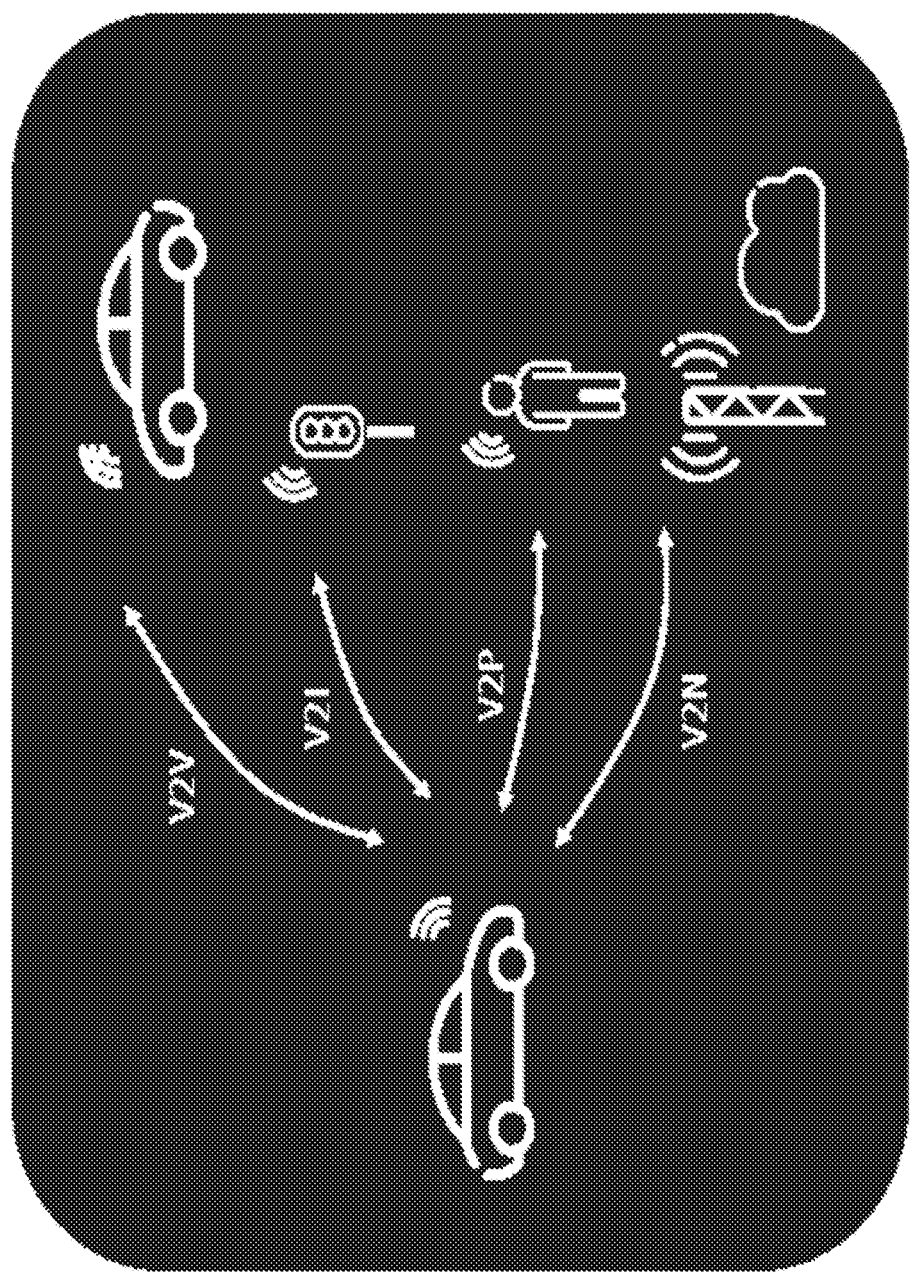
FIG. 1 is an overview depicting different vehicle communications.
Figure 2:
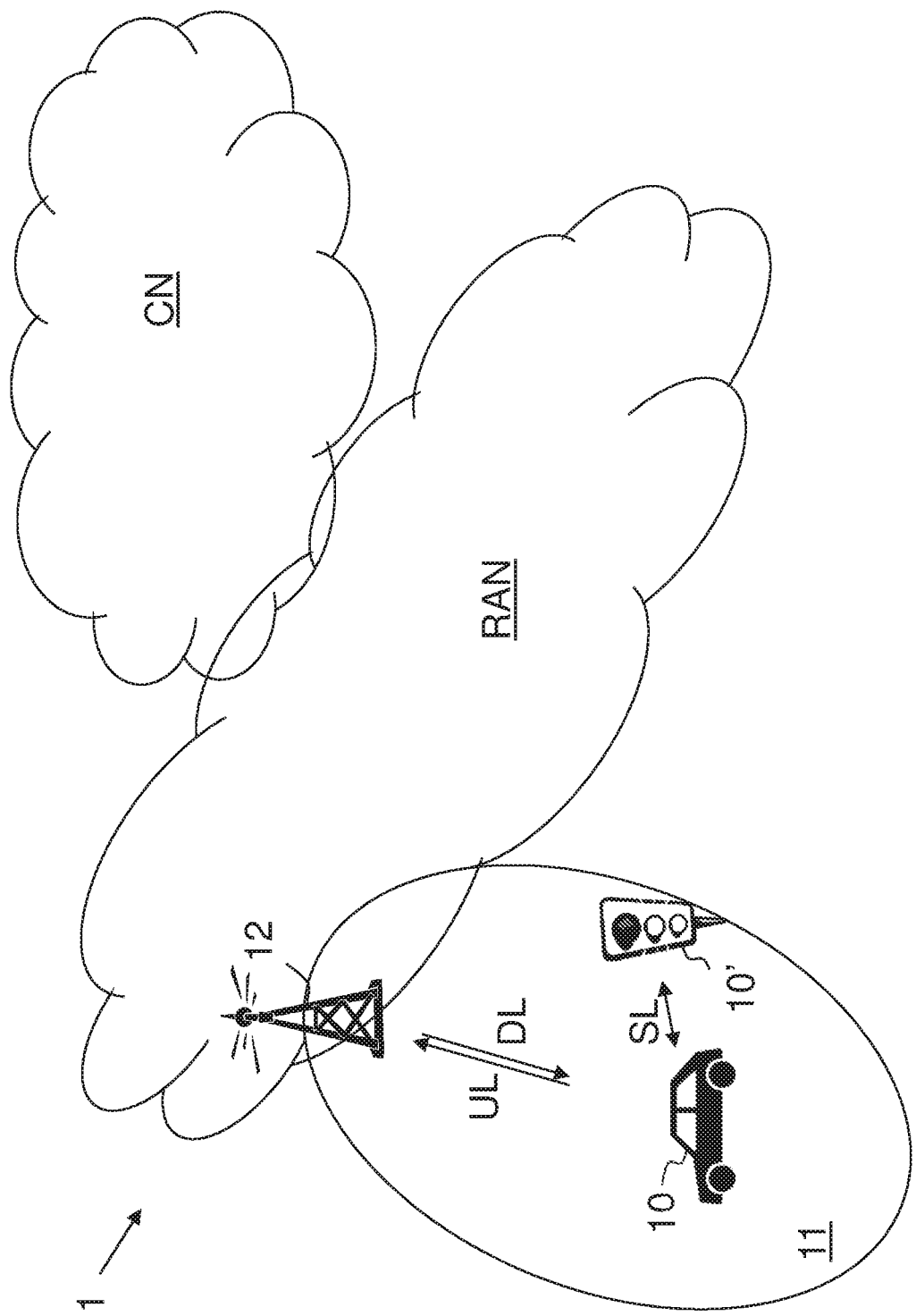
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context, however, embodiments are also applicable in further development of existing wireless communication systems such as e.g. LTE and Wideband Code Division Multiple Access (WCDMA).

In the wireless communication network 1, wireless devices configured to communicate with one another over a sidelink e.g. a wireless device 10 and another or second wireless device 10', such as a Device to device terminal in a vehicle e.g. a mobile station, a non-access point (non-AP) STA, a STA, a user equipment and/or a wireless terminal, may be configured for communication from a NW for e.g. V2x communication. It should be understood by the skilled in the art that "wireless device" is a non-limiting term which means any terminal, wireless communication terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device. Embodiments herein may relate to vehicle to anything communication wherein the first wireless device 10 may be a vehicle and the second wireless device 10' may be a stop sign (V2I), a radio network node (V2N), a device on a pedestrian (V2P), or another vehicle (V2V) or vice versa.

The wireless communication network 1 comprises a radio network node 12 providing radio coverage over a geographical area, a service area 11, of a first radio access technology (RAT), such as NR or similar. The radio network node 12 configures the sidelink for the wireless devices. The radio network node 12 may be a transmission and reception point such as an access node, an access controller, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the wireless device 10 in form of DL transmissions to the wireless device 10 and UL transmissions from the wireless device 10. It should be noted that a service area may be denoted as cell, beam, beam group or similar to define an area of radio coverage.

In the following we mainly focus on certain QoS performance requirements or characteristics such as, e.g. data rate, reliability, latency, to which a certain sidelink packet may be associated to. However embodiments herein may easily be generalized to other QoS requirements also referred to as QoS indicators.

Figure 3:
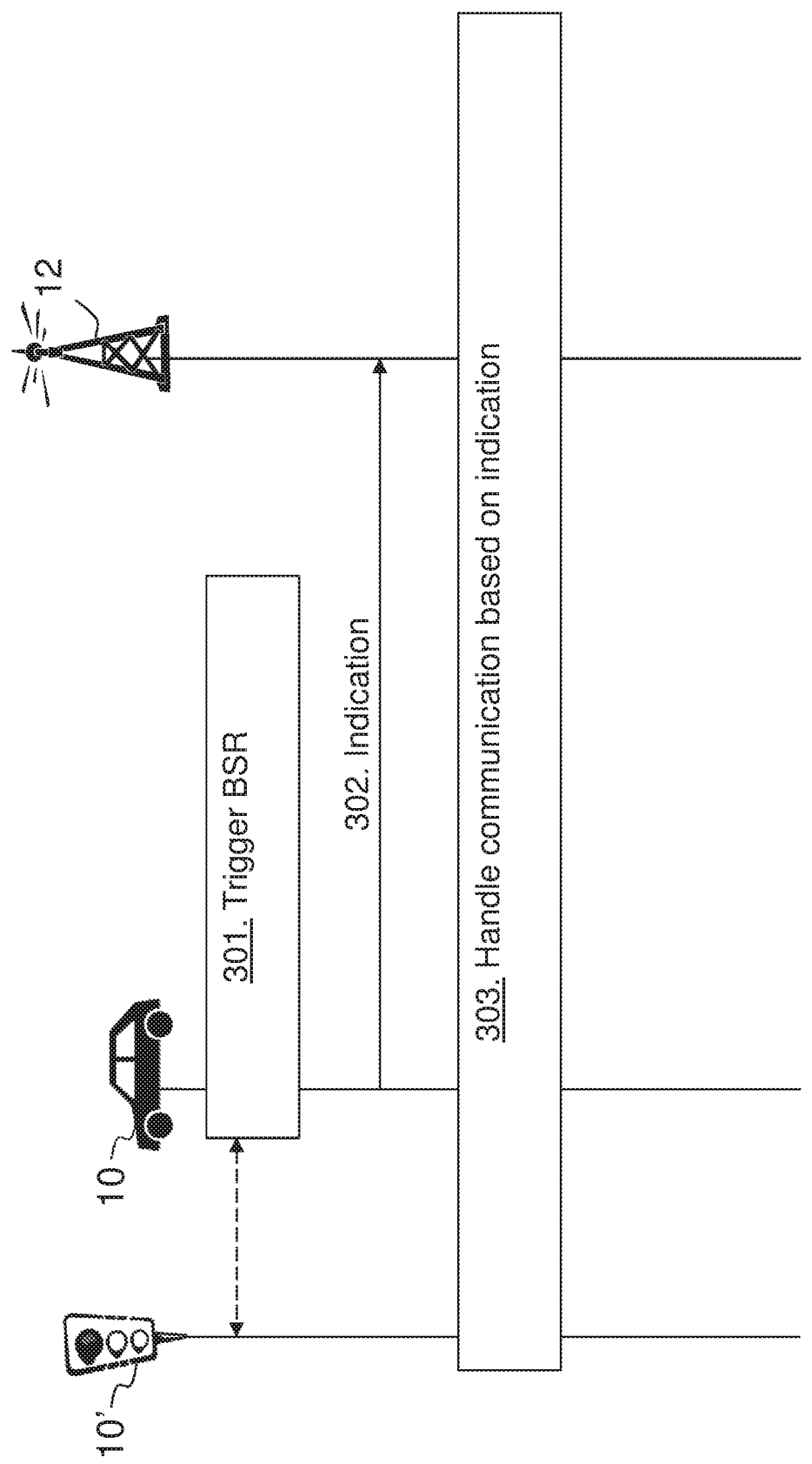
FIG. 3 shows a combined flowchart and signalling scheme according to embodiments herein.

FIG. 3 is a combined flowchart and signalling scheme according to embodiments herein Action 301, The wireless device 10 may trigger a BSR of packets between the wireless device 10 and another wireless device such as the second wireless device 10'.

Action 302. The wireless device 10 transmits an indication indicating a QoS requirement, also referred to as QoS characteristic(s), associated with the sidelink. The indication is transmitted in a buffer status report (BSR), wherein the indication indicates one or more QoS requirements or characteristics of a packet in a buffer associated to the buffer status report. That is, the packet is in a buffer for which buffer the BSR is triggered. The indication is associated with a logical channel e.g. via a logical channel ID (LCID) or a logical channel group (LOG), Thus, the indication may be a value mapped to a LCG and a QoS requirement or similar. The indication is comprised in the BSR to the radio network node 12. The indication may comprise one or more values each indicating a respective QoS requirement. The one or more QoS requirements or characteristics comprise at least one of: reliability, latency, and data rate. The wireless device 10 may transmit a BSR indicating more than PPPP e.g. also ProSe Per Packet Reliability (PPPR). The wireless device 10 may transmit a BSR indicating more than one QoS requirement or characteristic.

In one method, the radio network node 12 may provide for certain QoS requirements a mapping between such QoS requirement and a certain LCG. Since there might be multiple QoS requirement, each of such QoS requirement may be mapped to a different LCG set. A LCG set includes all the LCGs, e.g. up to 4, associated to a specific QoS requirement.

Such configuration indication indicating such mapping may be provided in dedicated signalling or broadcast signalling. Once the wireless device 10 has received the configuration indication, the wireless device 10 may determine one or more performance characteristics, being examples of QoS requirements or characteristics, of a packet in a buffer and may associate each individual performance characteristic to one of the LCG in the LCG set configured for this specific performance characteristics.

The LCGs of one (or more) LCG sets may then be reported in the SL BSR to the radio network node 12. Thus the wireless device 10 may transmit the indication, being an LCG indication, to the radio network node 12.

Different methods can be envisaged for the design of the SL BSR reported in the MAC control element (CE), depending on how the different sets of LCGs are represented.

Action 303. The radio network node 12 then handles the communication of the wireless device 10 taking the received indication into account, e.g. the radio network node 12 may activate sidelink packet duplication if the wireless device 10 has packets in the SL buffer which require high reliability delivery, or it may activate one or more carriers depending on the data rate of the packet to transmit. Decisions on the actual transmitting parameters, e.g. MCS, Transmission (Tx) power, number of PRBs, etc., to be adopted by the wireless device 10 may also be affected. E.g. the radio network node 12 may configure packet duplication for all packets having a reliability requirement of a certain relevance i.e. preset threshold of QoS requirement.

In one method each set of LCGs is represented by a group of a certain number of LCGs, and each LCG in the set is identified by a certain ID. LCGs of different sets are mapped to different LCG IDs, e.g. in consecutive order. So that, for example the QoS requirements related to PPPP are mapped to LCG1, LCG2, LCG3, LCG4. The QoS requirements related to reliability are mapped to LCG5, LCG6, LCG7, LCG8. And so on, for the different QoS requirement which are relevant for the a given V2X service which is represented by the destination index in the SL BSR MAC. For each destination index (which identifies a V2X service type), it is associated one or more logical channel group associated to the QoS of interest for the destination index, (Pre)configuration may indicate the QoS of interest for each V2X service type, so that the wireless device/radio network node will just configure the reporting of the QoS of interest for the specific V2X service type that the wireless device needs to transmit. Relevant QoS requirement may e.g. be a subset of QoS requirements, e.g. indicated by the radio network node or having requirement values above a certain threshold, that the wireless device should consider when generating the BSR.

Therefore, when receiving a SL BSR, the radio network node 12 can understand the amount of data corresponding to the different QoS characteristic that may be available in the wireless device sidelink buffer for transmission, for a specific destination index.

The mapping between QoS requirement and LCGs or set/group of LCG can be provided by the NW or preconfigured, and different sets of LCGs may contain different number of LCGs.

Therefore according to this method, the SL BSR may look like in FIG. 4, where different octets corresponding to different LCG IDs are mapped to different groups of QoS characteristics. In FIG. 4, for simplicity, 4 LCGs are considered, with $LCG_{1-2}$ mapped to PPPP and $LCG_{3-4}$ mapped to reliability. Considering N destination indexes, X LCGs and Y QoS characteristics of interest, the SL BSR MAC CE will delivery at most N*X*Y buffer size status to the radio network node 12.

In another method, the LCG IDs are the same across different sets or group of LCGs for different QoS characteristics, and unlike previous method, different SL BSR MAC CEs may be used to report the BSR related to different QoS. Each SL BSR MAC CE carries information related to different QoS, and it is uniquely identified by a dedicate LCID value in the MAC header, Depending on different SL BSR triggering condition, the wireless device 10 may trigger the SL BSR MAC CE associated to a QoS characteristic or to another, thereby appending a specific configured LCID value to represent the specific MAC CE in the MAC subheader.

In another method, the LCG IDs are the same across different sets or groups of LCGs for different QoS characteristics, and unlike previous method, the same SL BSR MAC CEs is used to report the BSR related to different QoS. This implies that each group or set of LCGs is assigned an ID which exclusively represents the group. It can be the network or the preconfiguration or specification to indicate the group ID associated to each QoS indicator, Depending on different SL BSR triggering condition, the wireless device 10 may trigger a SL BSR MAC CE associated to a QoS characteristic or to another, thereby appending the specific configured group ID to which the LCGs therein are associated. For example, in the SL BSR MAC CE some specific field, e.g. field may be used to represent the specific group, i.e. 'G=00' may represent the PPPP-related information, and 'G=01' may represent the reliability-related information, How many 'G' bits should be reserved to represent the different groups of QoS, may depend on the amount of QoS indicators that are of interest.

FIG. 5 shows Group reporting in MAC CE. In another method, one LCG in one LCG set is made up of logical channel identifiers which are allocated for a given QoS requirement of the packet, Wherein the logical channel identities can be different for different set of QoS. For example, on the basis of the PPPP, a given packet may be mapped by the wireless device 10 to the ordinary logical channel ID (LCID) by the MAC entity which in its turn is grouped into a specific LCG set A, and at the same time the same packet may mapped by the MAC entity to another logical channel tag which belongs to another LCG set B. The LCG set A is used by the MAC entity for the logical channel prioritization, while the LCG set B is used to report to radio network node 12 the buffer status of a specific QoS requirement, following one of the aforementioned MAC CE design.

In yet another embodiment, the (pre)configuration maps a certain packet having certain QoS characteristics into a specific LCID depending on the QoS characteristic of interest. For example, if a packet has a very stringent reliability requirement, and relaxed latency requirement, such packet is mapped into a specific set of LCIDs which are dedicated or reserved to packets of stringent reliability requirement. The LCGs in which such set of LCIDs may be mapped may be also reserved.

As an example, it is taken the case of packet duplication (i.e. same packet to be transmitted twice over different carriers). The radio network node 12 may configure packet duplication for all the packets having reliability requirement of certain relevance, said ProSe Per Packet Reliability (PPPR) such as PPPR1 and PPPR2.

One replica of the duplicate packet may be mapped to LCIDs, taking into account one QoS characteristic (e.g. the PPPP), while the other replica of the duplicate packet may be mapped to LCIDs, taking into account the reliability characteristics (e.g. PPPR1/2), The MAC entity may be configured such that one of the duplicate with PPPR1 is mapped to one of the available LCID on the basis of the PPPP, while the other duplicate is mapped to another reserved LCID on the basis of the PPPR (which is PPPR1 in this case). Similarly, if there is another packet with PPPR2 to be transmitted, such packet may be mapped to a certain LCID (on the basis of the associated PPPP), and to another reserved LCID on the basis of the associated PPPR (which is PPPR2 in this case). Such latter LCID may or may not be the same as the LCID associated to the previous packet having PPPR1. The set of LCIDs dedicated to the relevant PPPR (in this case PPPR1 and PPPR2), may be grouped into a specific LCG ID which can be exclusively dedicated to the LCIDs having relevant PPPR. The wireless device 10 may not allocate LCIDs of packets with non-relevant QoS requirement to the LCG ID which is reserved to the LCIDs of packets with relevant QoS requirement, i.e. PPPR1 and PPPR2 in this case. In one embodiment, the wireless device 10 may indicate to the network, e.g. via RRC signalling, the LCIDs which are reserved for packets having certain QoS characteristics.

In this case, the MAC CE design may look like the one in FIG. 4, in which one or more specific LCGs associated by the radio network node 12 to a certain LCG group is identified by the radio network node 12 as delivering information about buffer status of packets which require a specific QoS, For example, FIG. 4, the group of LCG3 and LCG4 are identified by the radio network node 12 as delivering information associated to the reliability requirement.

Triggering conditions for the SL BSR may be e.g. periodic triggering, or new data becoming available for a logical channel of higher priorities than any other logical channel with data already available in the buffer.

If the same packet is mapped to one or more different logical channel group sets corresponding to different QoS, it may or may not trigger the SL BSR depending on the priority of such packet in the different associated logical channel groups sets to which it has been mapped. For example, if in at least one of the LCG belonging to one set of LCG in which a packet has been assigned, the packet has highest priority than all the other packets in any LCG belonging to the same set of LCGs, a SL BSR will be triggered.

For example, lets considers as in FIG. 4, two sets of LCGs, i.e. LCG1 and 2 associated to priority characteristics, and LCG3 and 4 to reliability. If a packet with LCID belonging to LCG1 is received and no other data currently in the buffer, a SL BSR is triggered. If another packet with LCID 2 belonging to LCG2 is received, no SL BSR is triggered since there is already a packet of highest priority in the UE buffer. If another packet with LCID 3 belonging to LCG3 is received, a SL BSR is triggered since the other two packets in the UE buffer have highest LCID priority but they belong to another LCG set.

Figure 6:
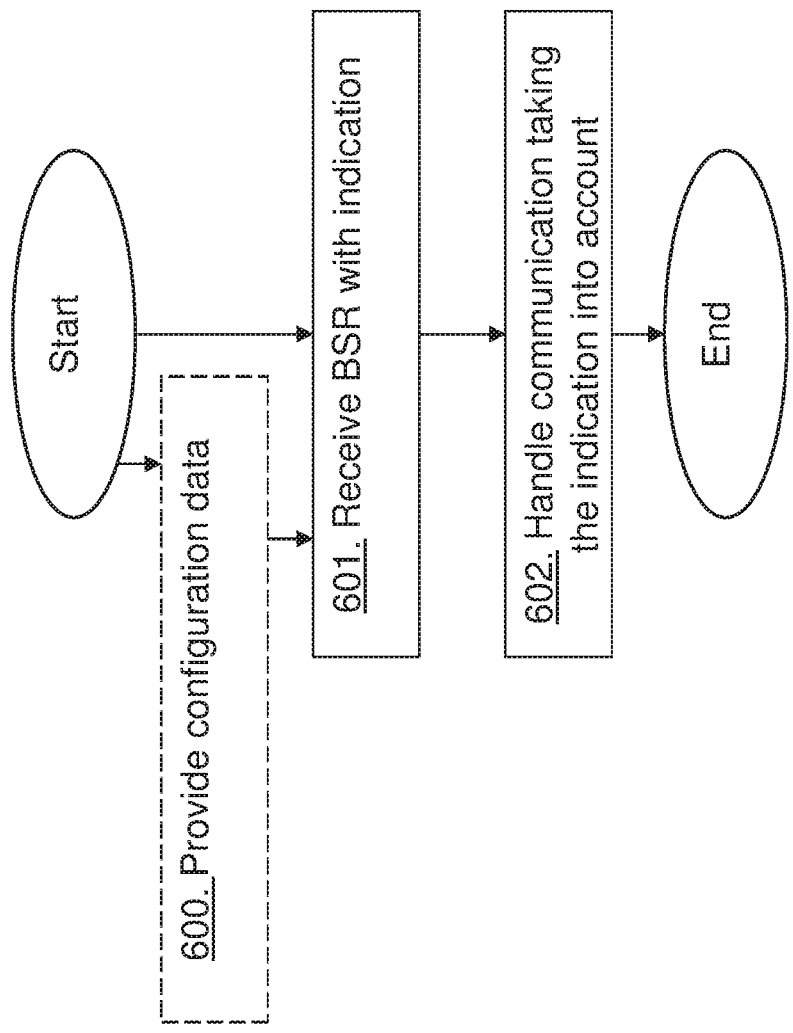
FIG. 6 shows a schematic flowchart depicting a method performed by a radio network node according to embodiments herein.

The method actions performed by the radio network node 12 for handling communication between wireless devices over the sidelink in the wireless communication network 1 according to embodiments will now be described with reference to a flowchart depicted in FIG. 6. The actions do not have to be taken in the order stated below, but may be taken in any suitable order.

Action 600. The radio network node 12 may provide the configuration indication to the wireless device 10, wherein the configuration indication defines a mapping between one or more QoS requirements and a logical channel group. This may be used to efficiently signal the indication.

Action 601. The radio network node 12 receives from the wireless device 10 of the wireless devices, an indication in the BSR, wherein the indication indicates one or more QoS requirements or characteristics of a packet in a buffer associated to the buffer status report. The indication being associated with a logical channel. The indication may be a value indicating a logical channel group. The indication may indicate more than one QoS requirement or characteristic. The one or more QoS requirements or characteristics comprise one or more of: a reliability, a latency and/or a data rate requirement of the packet.

Action 602. The radio network node 12 then handles the communication of the wireless device taking the received indication into account. The radio network node 12 may handle the communication of the sidelink by: activating sidelink packet duplication with the proviso that the wireless device 10 has packets in the buffer which require high reliability delivery as indicated by the received indication; activating one or more carriers depending on a data rate of the packet to transmit as indicated be the received indication; deciding on one or more transmitting parameters to be adopted by the wireless device based on the received indication. The radio network node 12 may handle packets on priority and also on e.g. reliability, data rate, or other performance requirement. This results in more flexible solution providing a wireless communication network of improved performance.

Figure 7:
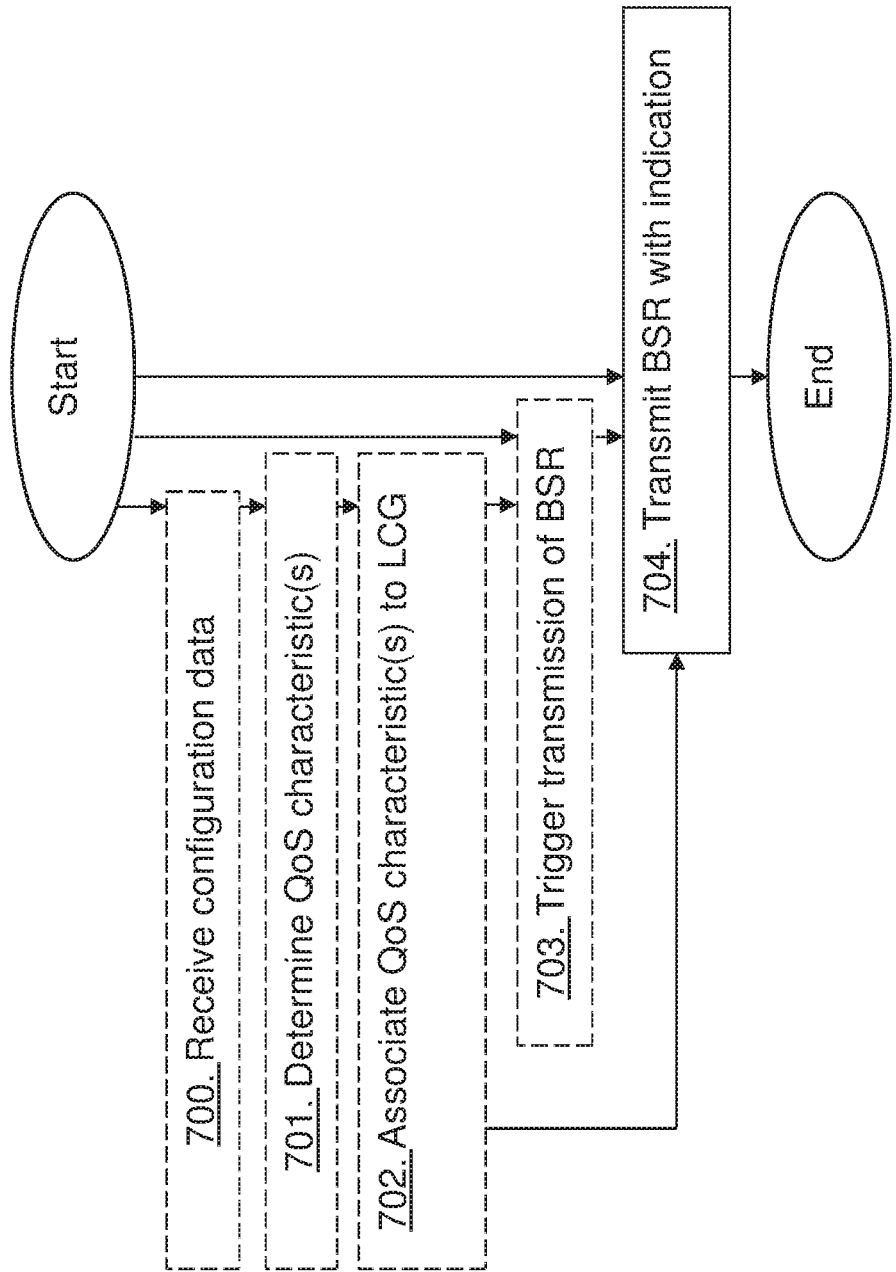
FIG. 7 shows a schematic flowchart depicting a method performed by a wireless device according to embodiments herein.

The method actions performed by the wireless device for handling communication between wireless devices, such as the wireless device 10 and the other wireless device 10', over a sidelink in the wireless communication network according to embodiments will now be described with reference to a flowchart depicted in FIG. 7. Actions performed in some embodiments are marked with dashed boxes. The actions may be performed in any suitable order.

Action 700. The wireless device 10 may receive the configuration indication, wherein the configuration indication defines a mapping between one or more QoS characteristics (or requirements) and a logical channel group.

Action 701. The wireless device 10 may determine one or more QoS (performance) characteristics of the packet in the buffer.

Action 702. The wireless device 10 may associate the one or more QoS characteristics to a LCG configured for QoS characteristics.

Action 703. The wireless device 10 may trigger transmission of the buffer status report. E.g. the transmission may be periodically triggered, or may be triggered with the proviso that data becoming available for a logical channel of a higher priority than any other logical channel with data already available in the buffer.

Action 704. The wireless device 10 transmits to the radio network node 12, the indication to in the buffer status report, wherein the indication indicates the one or more QoS requirements or characteristics of the packet in the buffer associated to the buffer status report. The indication is associated with a logical channel e.g. being a value indicating the LCG or similar. The one or more QoS requirements or characteristics comprise reliability, latency and/or data rate requirement of the packet.

Figure 8:
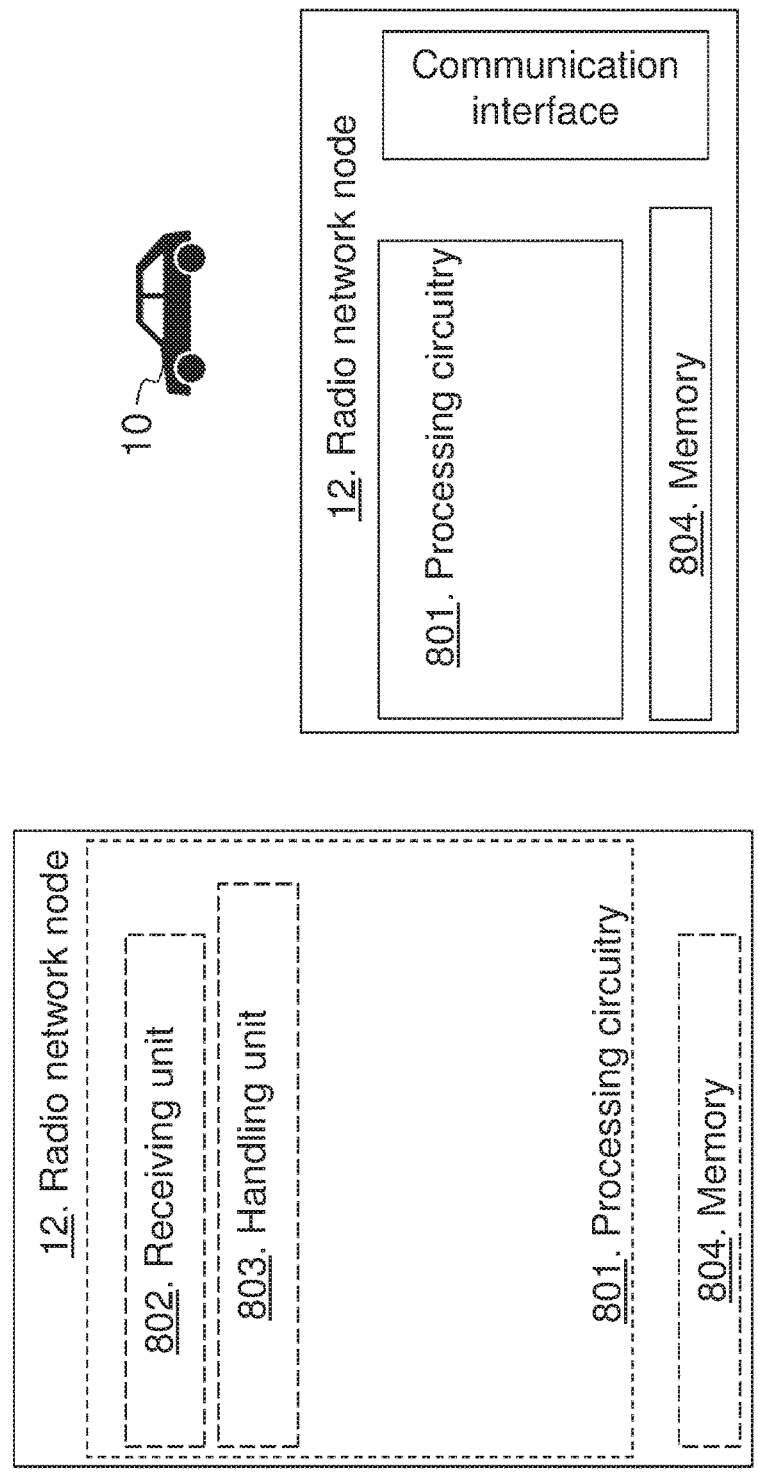
FIG. 8 is a block diagram depicting a radio network node according to embodiments herein.
Figure 8:
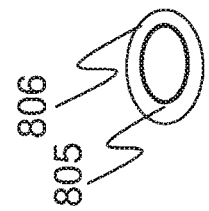

FIG. 8 is a block diagram depicting the radio network node 12 for handling communication between wireless devices over the sidelink in the wireless communication network according to embodiments herein.

The radio network node 12 may comprise processing circuitry 801, e.g. one or more processors, configured to perform the methods herein.

The radio network node 12 may comprise a receiving unit 802, e.g. a receiver module or a transceiver module. The radio network node 12, the processing circuitry 801, and/or the receiving unit 802 is configured to receive from the wireless device 10 of the wireless devices, the indication in the BSR, which indication indicates the one or more QoS requirements or characteristics of a packet in the buffer associated to the buffer status report and being associated with a logical channel. The indication may be a value indicating a logical channel group. The one or more QoS requirements or characteristics comprise at least one of a reliability, a latency, and data rate requirement of the packet.

The radio network node 12 may comprise a handling unit 803. The radio network node 12, the processing circuitry 801, and/or the handling unit 803 is configured to handle the communication of the wireless device taking the received indication into account. The radio network node and/or the processing circuitry 801 may be configured to handle the communication of the sidelink by; activating sidelink packet duplication with the proviso that the wireless device 10 has packets in the buffer which require high reliability delivery as indicated by the received indication; activating one or more carriers depending on a data rate of the packet to transmit as indicated be the received indication; deciding on one or more transmitting parameters to be adopted by the wireless device 10 based on the received indication.

The radio network node 12 and/or the processing circuitry 801 may be configured to provide the configuration indication to the wireless device 10, wherein the configuration indication defines the mapping between one or more QoS requirements and a logical channel group. The radio network node 12 further comprises a memory 804. The memory comprises one or more units to be used to store data on, such as indications, configuration indications, QoS requirements and characteristics and mapping to LCG or LCID, applications to perform the methods disclosed herein when being executed, and similar.

The methods according to the embodiments described herein for the radio network node 12 are respectively implemented by means of e.g. a computer program product 805 or a computer program, comprising instructions, i.e., software code portions, which, when executed on at least one processor, cause the at least one processor to carry out the actions described herein, as performed by the radio network node 12. The computer program product 805 may be stored on a computer-readable storage medium 806, e.g. a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

Figure 9:
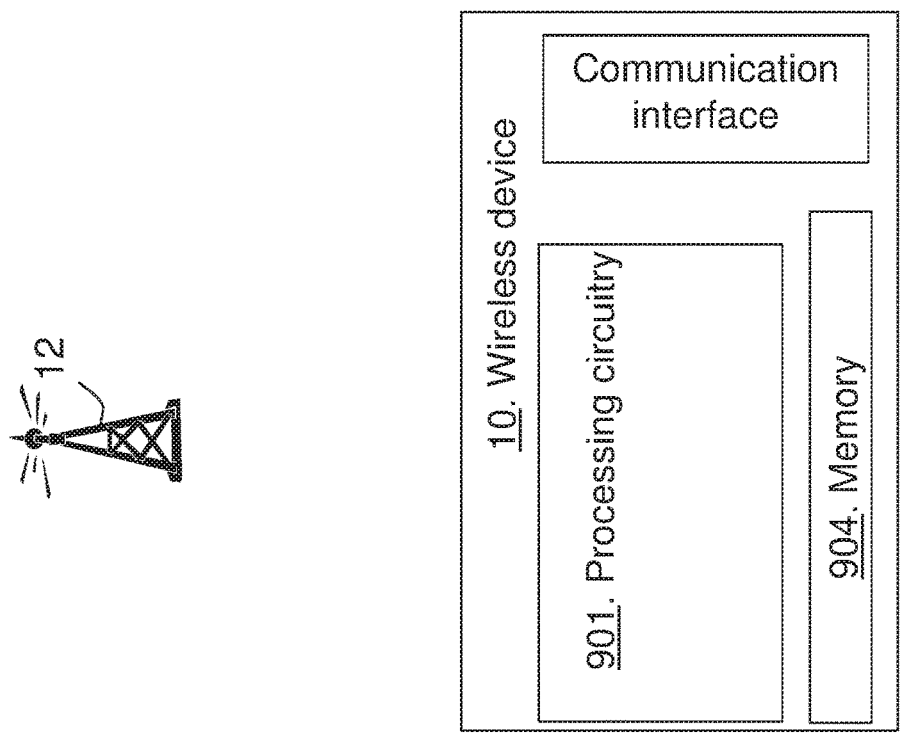
FIG. 9 is a block diagram depicting a wireless device according to embodiments herein.
Figure 9:
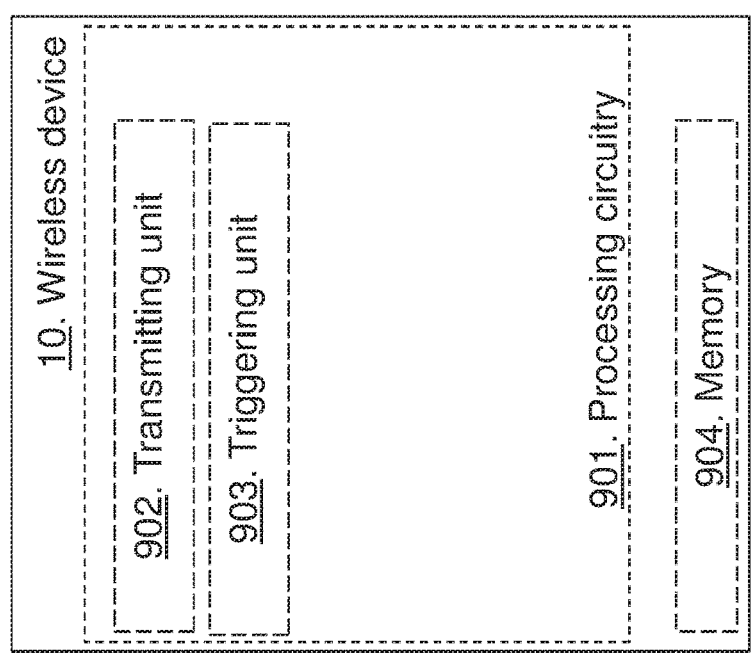
Figure 9:
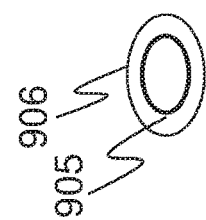

FIG. 9 is a block diagram depicting the wireless device 10 for handling communication between the wireless device 10 and another wireless device over a sidelink in the wireless communication network e.g. in vehicle to anything communication according to embodiments herein.

The wireless device 10 may comprise processing circuitry 901, such as one or more processors, configured to perform methods herein.

The wireless device 10 may comprise a transmitting unit 902, e.g. a transmitter module or transceiver module. The wireless device 10, the processing circuitry 901, and/or the transmitting unit 902 is configured to transmit the indication to the radio network node in the BSR, which indication indicates one or more QoS requirements or characteristics of a packet in the buffer in the wireless device, associated to the buffer status report, and being associated with a logical channel. The indication may be a value indicating a logical channel group. The one or more QoS requirements or characteristics comprise at least one of reliability, latency, and data rate. The QoS requirement may comprise more than one QoS requirement or characteristic e.g. reliability and data rate requirement of the packet.

The wireless device 10 may comprise a triggering unit 903. The wireless device 10, the processing circuitry 901, and/or the triggering unit 903 may be configured to trigger transmission of the BSR. The transmission may be periodically triggered, or the transmission may be triggered with the proviso that data becoming available for a logical channel of a higher priority than any other logical channel with data already available in the buffer.

The wireless device 10 and/or the processing circuitry 901 may be configured to receive the configuration indication, wherein the configuration indication defines the mapping between one or more QoS requirements and the LOG, The wireless device 10 and/or the processing circuitry 901 may be configured to determine the one or more QoS characteristics of the packet in the buffer; and to associate the one or more QoS characteristics to a LCG configured for QoS characteristics.

The wireless device 10 further comprises a memory 904. The memory comprises one or more units to be used to store data on, such as indications, configuration indications, mapping information, QoS requirements or characteristics, applications to perform the methods disclosed herein when being executed, and similar.

The methods according to the embodiments described herein for the wireless device 10 are respectively implemented by means of e.g. a computer program product 905 or a computer program, comprising instructions, i.e., software code portions, which, when executed on at least one processor, cause the at least one processor to carry out the actions described herein, as performed by the wireless device 10, The computer program product 905 may be stored on a computer-readable storage medium 906, e.g. a disc, a USB stick or similar. The computer-readable storage medium 906, having stored thereon the computer program product, may comprise the instructions which, when executed on at least one processor, cause the at least one processor to carry out the actions described herein, as performed by the wireless device 10. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
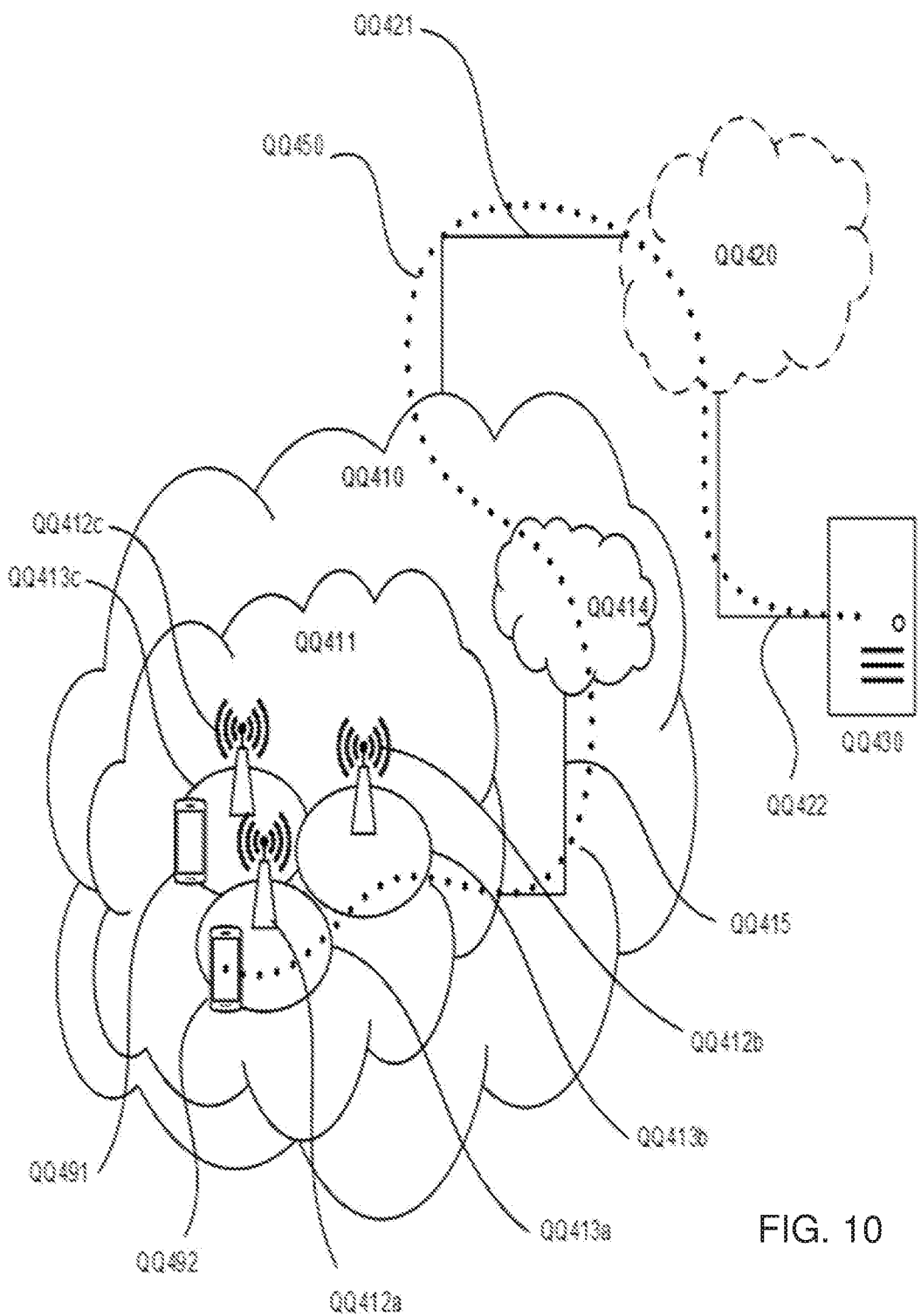
FIG. 10 shows a telecommunication network connected via an intermediate network to a host computer in accordance with some embodiments.

FIG. 10: Telecommunication network connected via an intermediate network to a host computer in accordance with some embodiments With reference to FIG. 10, in accordance with an embodiment, a communication system includes telecommunication network QQ410, such as a 3GPP-type cellular network, which comprises access network QQ411, such as a radio access network, and core network QQ414, Access network QQ411 comprises a plurality of base stations QQ412a, QQ412b, QQ412c, such as NBs, eNBs, gNBs or other types of wireless access points being examples of the radio network node 12 above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c, A second UE QQ492 in coverage area QQ413a is wirelessly connectable to the corresponding base station QQ412a. While a plurality of UEs QQ491, QQ492 are illustrated in this example being examples of the wireless device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
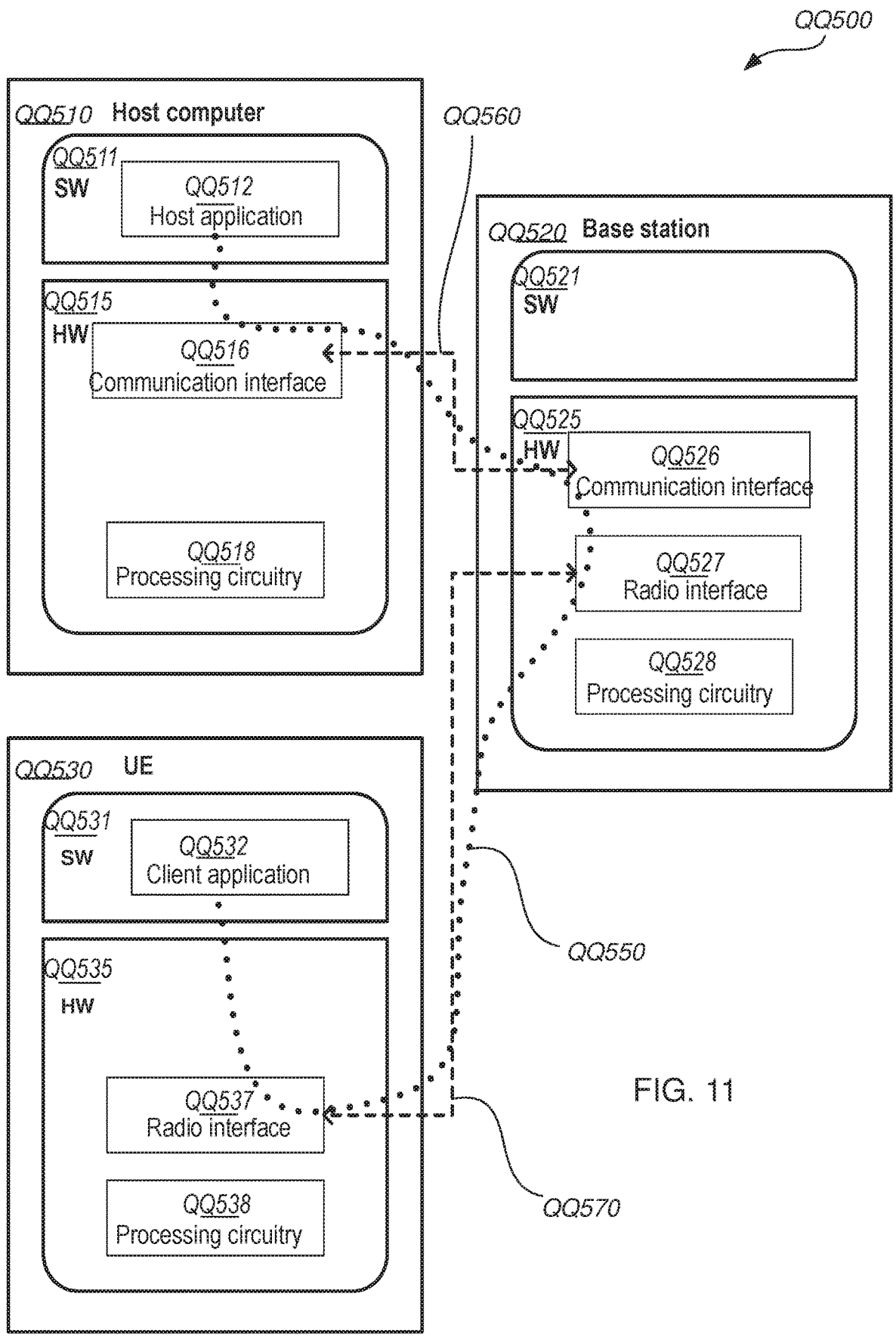
FIG. 11 shows a host computer communicating via a base station with a user equipment over a partially wireless connection in accordance with some embodiments.

FIG. 11: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions, Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure, One or more of the various embodiments improve the performance of OTT services provided to UE QQ530 using OTT connection QQ550, in which wireless connection QQ570 forms the last segment, More precisely, the teachings of these embodiments may improve the latency since the resources that may be used in the SL is used in a more efficient manner since the SL may be allocated resources due to the one or more QoS requirements or characteristics of packets and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ000 while it monitors propagation times, errors etc.

Figure 12:
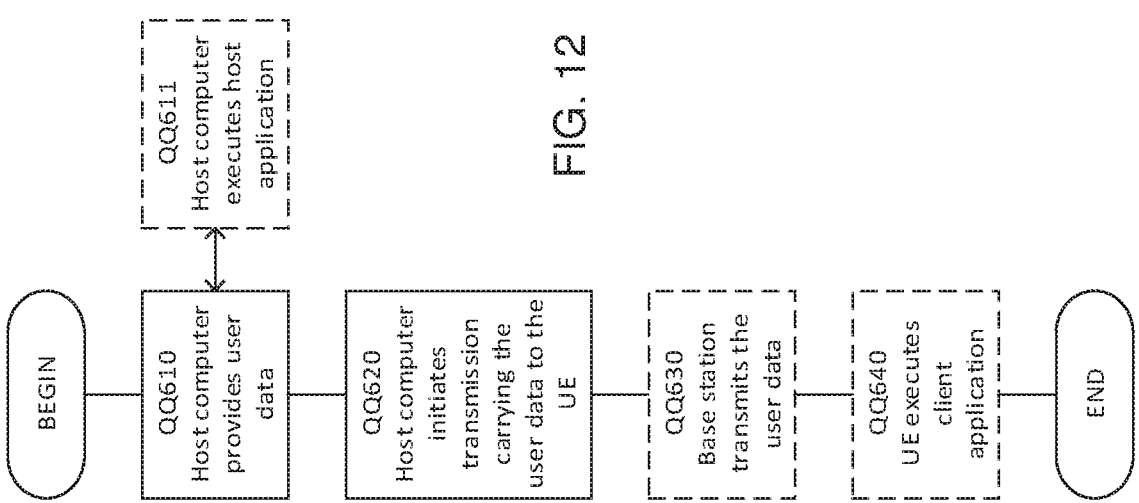
FIG. 12 shows methods implemented in a communication system including a host computer, a base station and a user equipment in accordance with some embodiments.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
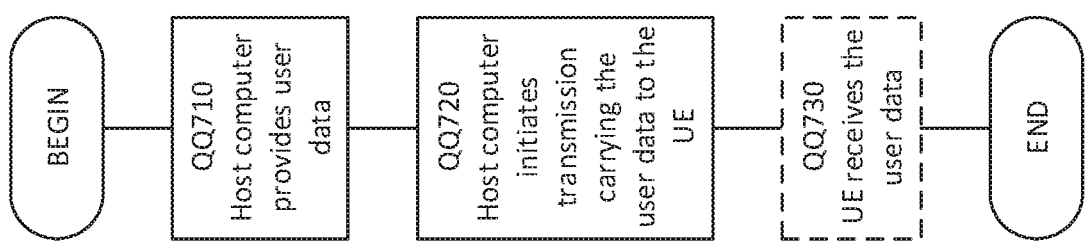
FIG. 13 shows methods implemented in a communication system including a host computer, a base station and a user equipment in accordance with some embodiments.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
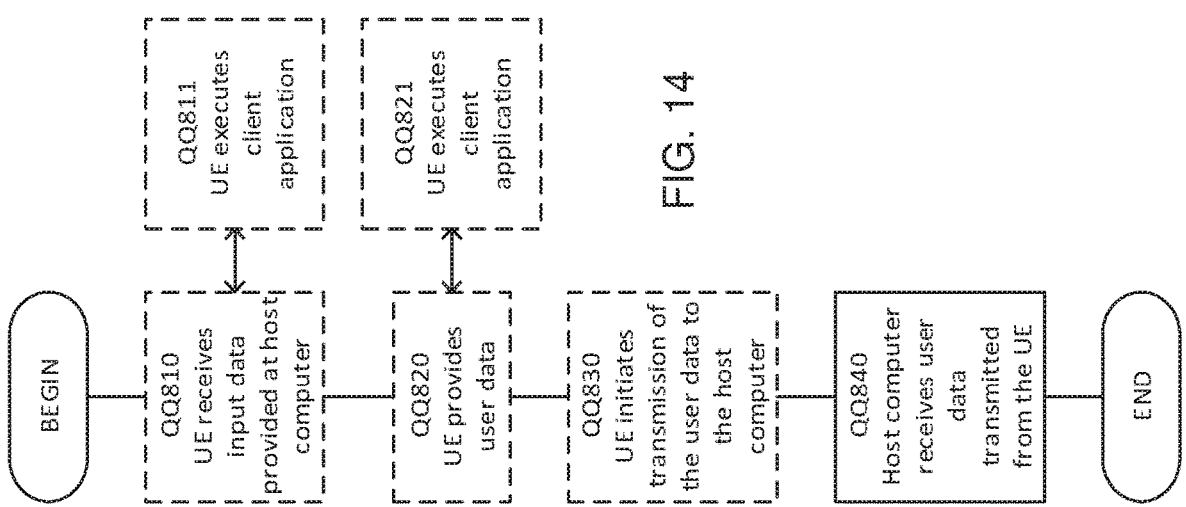
FIG. 14 shows methods implemented in a communication system including a host computer, a base station and a user equipment in accordance with some embodiments.

FIG. 14: Methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
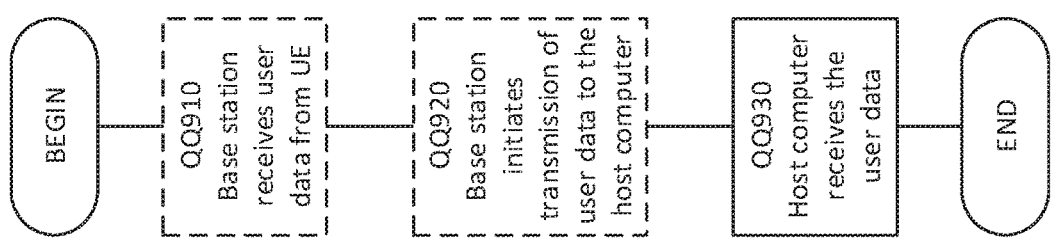
FIG. 15 shows methods implemented in a communication system including a host computer, a base station and a user equipment in accordance with some embodiments.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATION EXPLANATION

3G Third Generation of Mobile Telecommunications Technology
BSM Basic Safety Message
BW Bandwidth
BSR Buffer Status Report
CAM Cooperative Awareness Message
CBR Channel Busy Ratio
DPTF Data Packet Transmission Format
D2D Device-to-Device Communication
DENM Decentralized Environmental Notification Message
DSRC Dedicated Short-Range Communications
eNB eNodeB ETSI European Telecommunications Standards Institute
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-(vehicle) communication
V2x Vehicle-to-anything-you-can-imagine
wrt with respect to
SPS Semi Persistent Scheduling
DMRS Demodulation reference signals
DCC Orthogonal cover code
PDCCH Physical Downlink Control Channel
DBS Delay-Based Scheduler
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCID Logical Channel Identity
MAC Medium Access Control
MAC CE Medium Access Control—Control Element
RRC Radio Resource Control
IP Internet Protocol
PPPP ProSe Per Packet Priority
PPPR ProSe Per Packet Reliability
ProSe Proximity Services
PRB Physical Resource Block
SL Sidelink
SPS Semi-Persistent Scheduling
UL Uplink
DL Downlink
LCG Logical Channel Group
SFN System Frame Number
TTI Transmission Time Interval
SCI Sidenlink Control Information
CA Carrier Aggregation
SLRBSidelink Radio Bearer
UICC Universal Integrated Circuit Card
ME Mobile Equipment
ID Identifier
PDB Packet Delay Budget
CBR Congestion Busy Ratio
SDU Service Data Unit
PDU Protocol Data Unit
BLERBlock Error Rate

The invention claimed is:

1. A method performed by a radio network node of a wireless communication network, the method comprising:
receiving a Buffer Status Report (BSR) from a wireless device, wherein the wireless device identifies in the BSR one or more Logical Channel Groups (LCGs) to indicate Pro Se Per Packet Priorities (PPPPs) applicable to transmission by the wireless device of one or more packets on a sidelink between the wireless device and another wireless device, and identifies one or more other LCGs in the BSR to indicate Quality-of-Service (QoS) requirements applicable to the transmission by the wireless device of the one or more packets on the sidelink; and
making a scheduling decision for scheduling the transmission by the wireless device of the one or more packets on the sidelink, according to the indicated QoS requirements in the BSR.

2. The method according to claim 1, further comprising providing a configuration indication to the wireless device, wherein the configuration indication defines the one or more LCGs used for indicating the PPPPs and the one or more other LCGs for indicating the QoS requirements.

3. The method according to claim 1, wherein making a scheduling decision for scheduling the transmission by the wireless device of the one or more packets on the sidelink comprises at least one of:
activating sidelink packet duplication, responsive to the indicated QoS requirements indicating that one or more of the one or more packets require high reliability delivery; and
activating one or more carriers, responsive to the indicated QoS requirements indicating that one or more of the one or more packets are associated with a high data rate.

4. A method performed by a wireless device with respect to a wireless communication network, the method comprising:
generating a Buffer Status Report (BSR), wherein the wireless device identifies in the BSR one or more Logical Channel Groups (LCGs) to indicate Pro Se Per Packet Priorities (PPPPs) applicable to transmission by the wireless device of one or more packets on a sidelink between the wireless device and another wireless device, and identifies one or more other LCGs in the BSR to indicate Quality-of-Service (QoS) requirements applicable to the transmission by the wireless device of the one or more packets on the sidelink; and
transmitting the BSR for a radio network node of the wireless communication network, to enable the radio network node to make a scheduling decision for scheduling the transmission by the wireless device of the one or more packets on the sidelink, in dependence on the indicated QoS requirements.

5. The method according to claim 4, further comprising triggering transmission of the buffer status report.

6. The method according to claim 5, wherein the triggering of the transmission is periodic, or responsive to data becoming available for transmission on the sidelink that is of a higher priority than any other data already available for transmission on the sidelink.

7. The method according to claim 4, further comprising receiving a configuration indication, wherein the configuration indication indicates the one or more LCGs to indicate the PPPPs applicable to the transmission by the wireless device of the one or more packets on the sidelink, and indicates the one or more other LCGs to indicate the QoS requirements applicable to the transmission by the wireless device of the one or more packets on the sidelink.

8. A radio network node configured for operation in a wireless communication network, wherein the radio network node comprises:
processing circuitry; and
a memory with a computer program stored thereon comprising instructions that, when executed on the processing circuitry, cause the radio network node to:
receive a Buffer Status Report (BSR) from a wireless device, wherein the wireless device identifies in the BSR one or more Logical Channel Groups (LCGs) to indicate Pro Se Per Packet Priorities (PPPPs) applicable to transmission by the wireless device of one or more packets on a sidelink between the wireless device and another wireless device, and identifies one or more other LCGs in the BSR to indicate Quality-of-Service (QoS) requirements applicable to the transmission by the wireless device of the one or more packets on the sidelink; and make a scheduling decision for scheduling the transmission by the wireless device of the one or more packets on the sidelink, according to the indicated QoS requirements in the BSR.

9. The radio network node according to claim 8, wherein the memory comprises instructions that cause the radio network node to provide a configuration indication to the wireless device, wherein the configuration indication defines the one or more LCGs used for indicating the PPPPs and the one or more other LCGs for indicating the QoS requirements.

10. The radio network node according to claim 8, wherein the memory comprises instructions that cause the radio network node to make the scheduling decision as:
   activating sidelink packet duplication, responsive to the indicated QoS requirements indicating that one or more of the one or more packets require high reliability delivery; or
   activating one or more carriers, responsive to the indicated QoS requirements indicating that one or more of one or more packets are associated with a high data rate.

11. A wireless device configured for operation with respect to a wireless communication network, wherein the wireless device comprises:
   processing circuitry; and
   a memory with a computer program stored thereon comprising instructions that, when executed on the processing circuitry, cause the wireless device to:
      generate a Buffer Status Report (BSR), wherein the wireless device identifies in the BSR one or more Logical Channel Groups (LCGs) to indicate Pro Se Per Packet Priorities (PPPPs) applicable to transmission by the wireless device of one or more packets on a sidelink between the wireless device and another wireless device, and identifies one or more other LCGs in the BSR to indicate Quality-of-Service (QoS) requirements applicable to the transmission by the wireless device of the one or more packets on the sidelink; and
      transmit the BSR for a radio network node of the wireless communication network, to enable the radio network node to make a scheduling decision for scheduling the transmission by the wireless device of the one or more packets on the sidelink, in dependence on the indicated QoS requirements.

12. The wireless device according to claim 11, wherein the memory comprises instructions that cause the wireless device to trigger a transmission of the buffer status report.

13. The wireless device according to claim 12, wherein the transmission is periodically triggered, or the transmission is triggered responsive to data becoming available for transmission on the sidelink that is of a higher priority than any other data already available for transmission on the sidelink.

14. The wireless device according to claim 11, wherein the wireless device is further configured to receive a configuration indication, wherein the configuration indication indicates the one or more LCGs to indicate the PPPPs applicable to the transmission by the wireless device of the one or more packets on the sidelink, and indicates the one or more other LCGs to indicate the QoS requirements applicable to the transmission by the wireless device of the one or more packets on the sidelink.

* * * * *